(12) United States Patent
Flanegan

(10) Patent No.: US 8,763,223 B2
(45) Date of Patent: Jul. 1, 2014

(54) TILE SPACER PUNCH DEVICE

(76) Inventor: Gregg Robert Flanegan, Hertford (GB)

(*) Notice: Subject to any disclaimer, the term of this patent is extended or adjusted under 35 U.S.C. 154(b) by 467 days.

(21) Appl. No.: 13/143,776

(22) PCT Filed: Jan. 19, 2010

(86) PCT No.: PCT/GB2010/050070
§ 371 (c)(1),
(2), (4) Date: Jul. 8, 2011

(87) PCT Pub. No.: WO2010/084341
PCT Pub. Date: Jul. 29, 2010

(65) Prior Publication Data
US 2011/0271639 A1    Nov. 10, 2011

(30) Foreign Application Priority Data
Jan. 21, 2009  (GB) .................................. 0900920.0

(51) Int. Cl.
| | | |
|---|---|---|
| B23P 19/04 | (2006.01) | |
| B25B 17/00 | (2006.01) | |
| B25B 23/16 | (2006.01) | |
| E04F 21/00 | (2006.01) | |
| G01B 3/30 | (2006.01) | |
| G01B 5/14 | (2006.01) | |
| G01B 1/00 | (2006.01) | |

(52) U.S. Cl.
CPC .............. *E04F 21/00* (2013.01); *E04F 21/0038* (2013.01); *E04F 21/0007* (2013.01); *G01B 3/30* (2013.01); *G01B 5/14* (2013.01); *G01B 1/00* (2013.01)
USPC ................. 29/253; 81/57; 81/177.1

(58) Field of Classification Search
CPC .............. G01B 3/00; G01B 5/00; G01B 1/00; E04F 21/00
USPC ......... 29/253; 52/749.11, 747.11, 553, 126.4, 52/126.7
See application file for complete search history.

(56) References Cited

U.S. PATENT DOCUMENTS

| | | | | |
|---|---|---|---|---|
| 1,448,895 | A * | 3/1923 | Yotta | 279/103 |
| 3,236,275 | A * | 2/1966 | Smith | 81/460 |
| 3,872,904 | A * | 3/1975 | Barlow | 81/460 |
| 4,793,068 | A * | 12/1988 | Golkar | 33/526 |
| 5,359,783 | A * | 11/1994 | Smith | 33/527 |
| 5,501,330 | A | 3/1996 | Betts | |
| 6,796,049 | B1 * | 9/2004 | Claxton | 33/527 |
| 7,073,416 | B2 * | 7/2006 | Kozak et al. | 81/460 |

FOREIGN PATENT DOCUMENTS

| | | |
|---|---|---|
| AU | 548523 | 12/1985 |
| EP | 1296006 | 3/2003 |

* cited by examiner

Primary Examiner — Lee D Wilson
Assistant Examiner — Seahee Yoon
(74) Attorney, Agent, or Firm — Robert Platt Bell

(57) ABSTRACT

A tile spacer punch device 10 comprises a rigid elongate body 12, which has a punch element 16 at one end and a grip 18. The punch element 16 has at least three arms 24, each arm 24 is at right angles to an adjacent arm 24. Preferably the arms 24 intersect and may also be in a common plane. More preferable, for of the said arms 24 are provided. Furthermore, the arms may form part of plates, and the plates may taper inwardly away from the grip. An upper surface 22 of the punch head 14 is preferably convexly domed and suitably resilient to accept repeated striking, for example, from a hammer or palm of a user's hand.

20 Claims, 3 Drawing Sheets

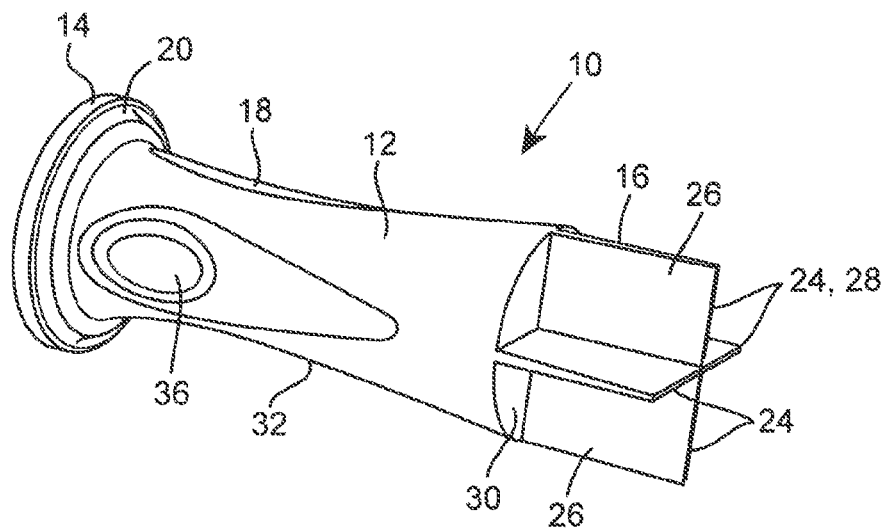
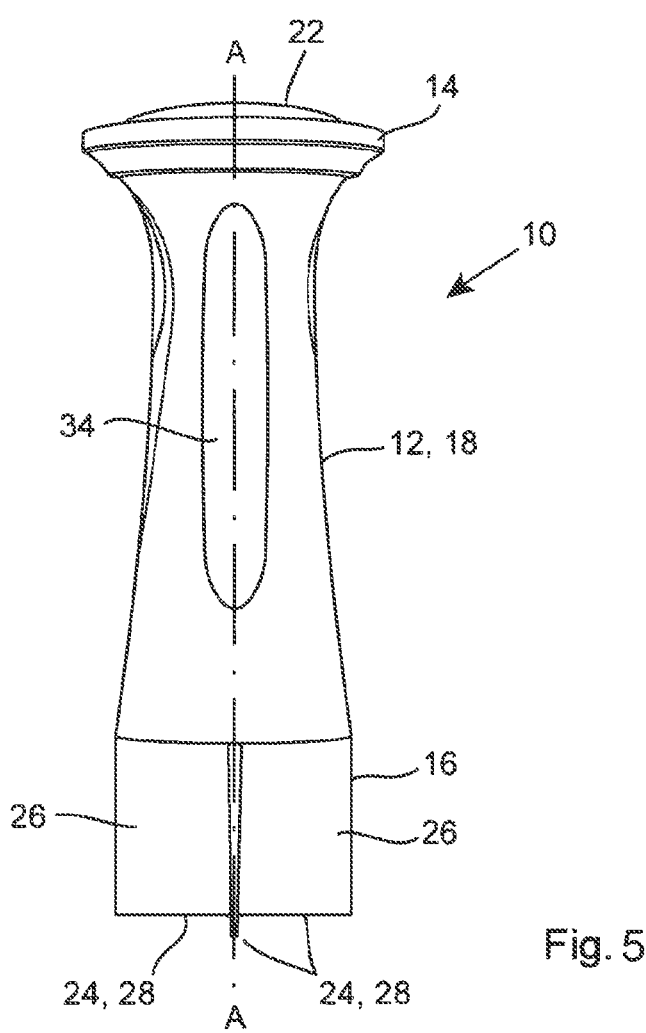
Fig. 4
Fig. 5

TILE SPACER PUNCH DEVICE

CROSS-REFERENCE TO RELATED APPLICATIONS

The present application is a National Phase Application of PCT/GB2010/050070, filed Jan. 19, 2010, which in turn claims priority from U.K. Patent Application No. GB 0900920.0 filed on Jan. 21, 2009, both of which are incorporated herein by reference.

FIELD OF THE INVENTION

The present invention relates to a tile spacer punch device for recessing a tile spacer relative to a plane of an adjacent tile or tiles.

BACKGROUND OF THE INVENTION

Tile spacers are small rigid plastics element, typically in a cross-shape, which are placed to abut corners of adjacent tiles to ensure consistently uniform spacing therebetween. An arm of the cross-shaped tile spacer can be snipped or broken off to form a T-shaped spacer. In this latter case, these are used to uniformly space tiles from an adjacent wall or edge of a room.

So that the tile spacers are not visible, they must be recessed below the level of the grout to be used between the tiles, which itself is typically slightly below an outer edge of the tiles. Standard methods of recessing the tile spacers are to use a tip end of one arm of another tile spacer to manually push the lower tile spacer deeper into the adhesive on the surface being tiles, or a screwdriver or scraper. These methods can often result in an adjacent tile being chipped thus requiring replacement, and/or the tile spacer in question being unevenly recessed thereby leaving one or more arms protruding.

The present invention seeks to provide a solution to these problems.

SUMMARY OF THE INVENTION

According to the present invention, there is provided a tile spacer punch device comprising a rigid elongate body having a punch element at one end and a grip, the punch element having at least three arms, each said arm being at right angles to an adjacent said arm.

BRIEF DESCRIPTION OF THE DRAWINGS

FIG. 4 shows a perspective view of one embodiment of a tile spacer punch device, in accordance with a second embodiment of the present invention.

FIG. 5 shows a side elevation view of the tile spacer punch device, shown in FIG. 4.

DETAILED DESCRIPTION OF THE INVENTION

Figure 1:
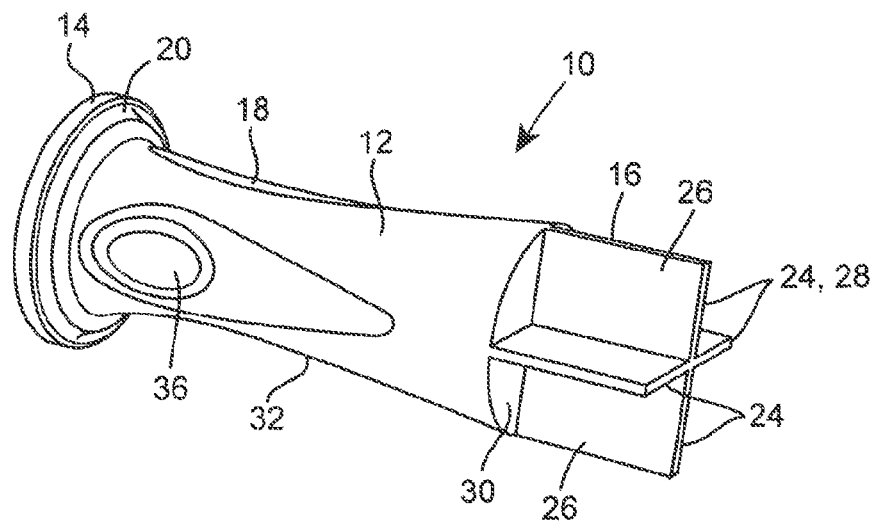
FIG. 1 shows a perspective view of one embodiment of a tile spacer punch device, in accordance with the invention.
Figure 2:
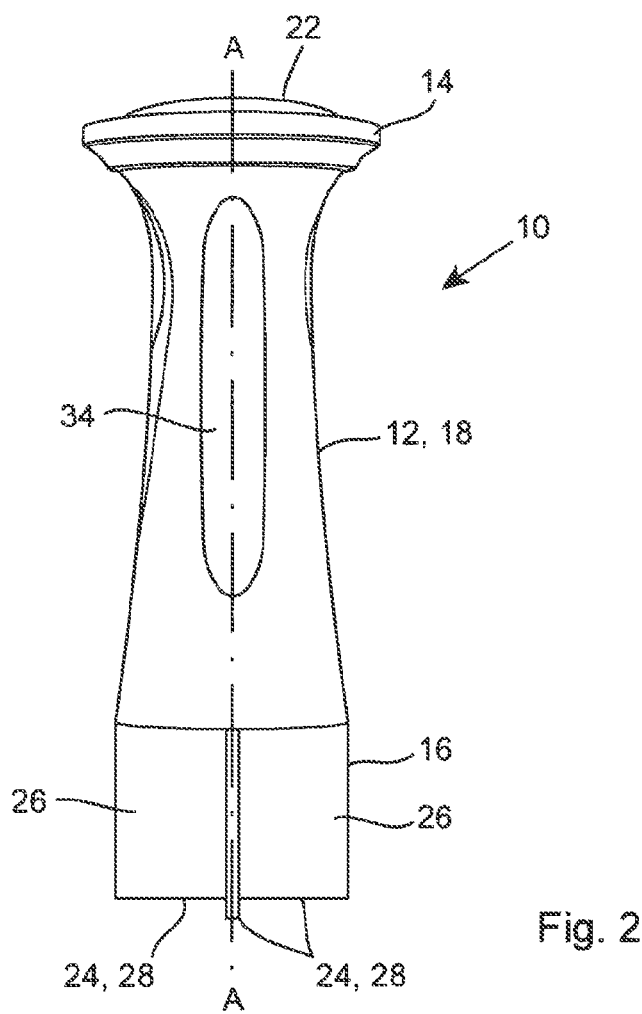
FIG. 2 shows a side elevation view of the tile spacer punch device, shown in FIG. 1.

Referring to the drawings, there is shown one embodiment of a tile spacer punch device 10 which comprises a body 12 having a punch head 14 at one end, a punch element 16 at the other opposite end, and a grip 18 therebetween.

The body 12 is preferably molded plastic, and rigid and elongate. In this embodiment, the body 12 is straight or rectilinear, but potentially the body 12 could be or include a curve.

The punch head 14 is preferably circular and integrally formed as one piece with the body 12. The punch head 14 is mushroom-shaped to thereby overlap the grip 18 in a radial direction and to provide some protection for a user's fingers when holding the grip 18. Preferably, a radial extent of the punch head 14 is equal to or greater than a radial or lateral extent of the punch element 16. An underside 20 of the punch head 14 is stepped to space a user's hand slightly away from the punch head 14. An upper surface 22 of the punch head 14 is preferably convexly domed and suitably resilient to accept repeated striking, for example, from a hammer or palm of a user's hand.

It is possible that the punch head 14 could be removable from the body 12 for replacement or for the attachment of a different head, for example, to aid usage in difficult to reach or awkward spaces.

The punch element 16 has four arms 24 of matching or substantially matching longitudinal extents, which intersect, preferably on the longitudinal axis A of the body 12. Each arm 24 is part of a rigid planar plate 26, which extends from an end of the grip 18 on the body 12. The arms 24 form a cross-shape, with the arms 24 being equi-angularly spaced apart, in this case by 90 degrees from each. The arms 24 are straight or rectilinear in a plane parallel to the longitudinal axis A of the body 12 and in a plane, which is at right angles to the longitudinal axis A of the body 12. The arms 24 are also rigid, and typically have lateral extents or widths which are less than or equal to lateral extents or widths of the arms of the tile spacer to be punched.

Lowermost surfaces 28 of the arms 24 lie in the same plane, and this plane is also perpendicular or substantially perpendicular to the longitudinal axis A of the body 12.

The base surface 30 of the grip 18, in this embodiment, is 5 planar, and therefore the plates 26, and thus also the arms 24, have uniform lateral cross-sections along the radial or longitudinal extents. The punch element 16, and thus also the arms 24, are provided in a plane which is parallel or substantially parallel to the base surface 30 of the grip 18.

Beneficially, the punch element 16 may be removably attached to the base of the portion of the body 12 having the grip 18. In this case, the punch element 16 can be selectable from amongst at least two punch elements. For example, it would be convenient to have a punch element with only three intersecting arms, which are spaced by 90 degrees, thus forming a T-shape, for use with a tile spacer having an arm removed for spacing a tile from a wall or edge of a room.

Furthermore, interchangeable punch elements having different lateral extents or widths may be provided for use with different sizes of tile spacers.

The grip 18 is typically integrally formed as part of the body 12, and includes a waisted portion 32 between the punch head 14 and the base surface 30 for easier gripping between the fingers of a user. The grip 18 may include a higher-friction lining, layer, coating or sleeve, such as rubber or an elastomer, or strip inserts 34 which extend in parallel or substantially parallel with the longitudinal extent of the body 12, again to aid grip.

An aperture 36 through the body 12, preferably at the grip 18 and adjacent to the punch head 14, may also be provided for hanging, for example, when stored or when being offered for sale.

Figure 3:
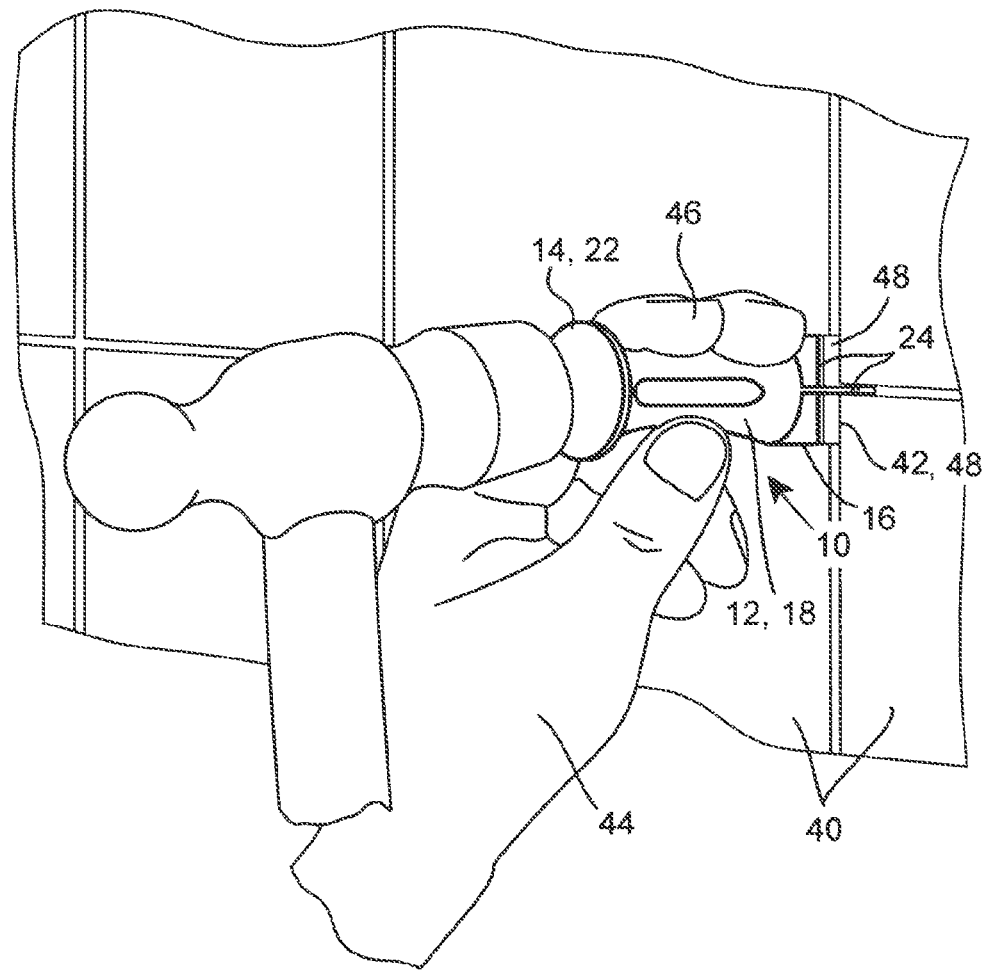
FIG. 3 shows the tile spacer punch device, when in use.

In use and referring to FIG. 3, whilst the tile mounting adhesive is still uncured or unset, and with the tiles 40 appropriately positioned around a tile spacer 42, a user 44 holds the punch device 10 by the grip 18 between his or her fingers 46, places the punch element 16 on the facing surface of the tile spacer 42 so that the arms 24 of the punch element 16 align or are superposed with the arms 48 of the tile spacer 42, and then taps the punch head 14 to evenly or uniformly urge the tile spacer 42 further into the adhesive, to thus be recessed below an intended surface of grouting to be placed in the gaps between the tiles 40 thereafter. Providing the lateral extents or widths of the arms 24 of the punch element 16 are less than or equal to the lateral extents or widths of the arms 48 of the tile spacer 42, then striking of the adjacent tile or tiles 40 is avoided, preventing or limiting the chance of damage.

Furthermore, due to the planar contact surface of the punch element 16, an even and uniform force is applied to the tile spacer 42, preventing or limiting the chance that one of the arms 48 of the tile spacer 42 will remain projecting above the surface of the grouting when applied.

FIG. 4 shows a perspective view of one embodiment of a tile spacer punch device, in accordance with a second embodiment of the present invention. FIG. 5 shows a side elevation view of the tile spacer punch device, shown in FIG. 4. In this second embodiment, the plates 26 may inwardly taper from the base 30 of the grip 18 to the lowermost surface 28 of the arms 24. The plates in this case still have a uniform lateral cross-sectional area in a direction at right angles to the longitudinal axis of the grip. The taper may be from, for example, 3 mm to 1 mm, but other dimensions are feasible, for example, from 3 mm to 1.5 mm. The taper is advantageous in that it reduces forces on edges of the tiles when the punch device is being urged therebetween, leading to the tiles being slightly forced apart if contact is made instead of causing damage.

The arms of the punch element preferably have a radial extent or length which matches, substantially matches or approaches that of the arm length of the tile spacer to be punched, so that the force applied by the punch device is evenly or substantially evenly distributed across the whole or substantially whole of the tile spacer.

Furthermore, the plates of the punch element are preferably dimensioned to enable cleaning of the arms without difficulty.

By way of example, typical dimensions of the punch device may be: total length of 65 mm; length of 50 mm for the grip and punch head; total diameter of punch element of 20 mm, lateral extent or width of arm and plate of 1 mm, maximum diameter of aperture may be 10 mm. However, other sizes may be envisaged.

Although an interchangeable punch element is suggested above, a range of tile spacer punch devices may be provided, and the punch device with the required punch element configuration can be selected therefrom.

The embodiment and modifications described above are provided by way of examples only, and various other modifications will be apparent to persons skilled in the art without departing from the scope of the invention as defined by the appended claims.

The invention claimed is:

1. A tile spacer punch device adapted to set a tile spacer between tiles and beneath a grout line of the tiles, the tile spacer punch device adapted to be impacted to set the tile spacers, the tile spacer punch device comprising:
a rigid elongate body having a punch element at one end and a grip in a middle portion, and a punch head at another end for striking,
the punch element extending from the middle portion to the one end and having at least three plates, each of the at least three plates extending contiguously from the middle portion to the one end, each of said at least three plates being at right angles to an adjacent one of said at least three plates, each of said at least three plates having a length substantially equal to a length of an arm of the tile spacer and adapted to engage a tile spacer, and
the punch head comprising an arcuate impact head suitably resilient to accept repeated striking, from a hammer or palm of a user's hand, an underside of the punch head having a stepped portion adapted to space a user's hand slightly away from the punch head.

2. The tile spacer punch device as claimed in claim 1, wherein each of said at least three plates intersect at an angle perpendicular to at least one other of said at least three plates.

3. The tile spacer punch device as claimed in claim 1, wherein an end portion of each of said at least three plates lie in a plane which is parallel or substantially parallel to a base of the grip.

4. The tile spacer punch device as claimed in claim 3, wherein said at least three plates comprises four equally sized plates which intersect.

5. The tile spacer punch device as claimed in claim 4, wherein said four equally sized plates are equi-angularly spaced apart.

6. The tile spacer punch device as claimed in claim 5, wherein said four equally sized plates form a cross shape.

7. The tile spacer punch device as claimed in claim 6, wherein each of said four equally sized plates is spaced from an adjacent one of said four equally sized plates by 90 degrees.

8. The tile spacer punch device as claimed in claim 7, wherein each of said four equally-sized plates has matching or substantially matching longitudinal extents.

9. The tile spacer punch device as claimed in a claim 8, wherein each of said four equally sized plates has a uniform lateral cross-section along its longitudinal extent.

10. The tile spacer punch device as claimed in claim 1, wherein each said at least three plates has a lateral extent which is less than a lateral extent of a tile spacer.

11. The tile spacer punch device as claimed in claim 1, wherein each said at least three plates extends from a the middle portion of the tile spacer punch device.

12. The tile spacer punch device as claimed in claim 11, wherein each said at least three plates is rigid and planar.

13. The tile spacer punch device as claimed in claim 12, wherein each said at least three plates tapers inwardly away from the grip.

14. The tile spacer punch device as claimed in claim 1, wherein a radial extent of the grip matches or substantially matches a longitudinal extent of each said arm.

15. The tile spacer punch device as claimed in claim 1, wherein the punch head has a radial extent which is equal to or greater than a longitudinal extent of each said arm.

16. The tile spacer punch device as claimed in claim 1, wherein the at least three plates taper from the middle portion of the rigid elongate body to the one end so as to have a uniform lateral cross-sectional area in a direction at right angles to the longitudinal axis of the grip, so as to reduce forces on edges of the tiles when the tile spacer punch is being urged therebetween, leading to the tiles being slightly forced apart if contact is made instead of causing damage.

17. The tile spacer punch device as claimed in claim 16, wherein the at least three plates taper from substantially 3 mm to 1 mm, wherein the at least three plates taper to reduce forces on edges of the tiles when the punch device is being urged therebetween, leading to the tiles being slightly forced apart if contact is made instead of causing damage.

18. The tile spacer punch device as claimed in claim 16, wherein the at least three plates taper from substantially 3 mm to 1.5 mm, wherein the at least three plates taper to reduce forces on edges of the tiles when the punch device is being urged therebetween, leading to the tiles being slightly forced apart if contact is made instead of causing damage.

19. The tile spacer punch device as claimed in claim 1, wherein the punch element and grip are separable.

20. The tile spacer punch device as claimed in claim 19, wherein the punch element is selectable from at least two different punch elements.

\* \* \* \* \*